United States Patent
Burns et al.

(10) Patent No.: US 10,807,892 B2
(45) Date of Patent: Oct. 20, 2020

(54) DEVICE FOR HOUSING BENEFICIAL MICROBES FOR THE PURPOSE OF WATER REMEDIATION

(71) Applicant: Blue Planet Environmental Inc., Whitchurch-Stouffville (CA)

(72) Inventors: David Burns, Whitchurch-Stouffville (CA); Richard Lonetto, Whitchurch-Stouffville (CA); Jason Yeo, Whitchurch-Stouffville (CA)

(73) Assignee: BLUE PLANET ENVIRONMENTAL INC., Ontario (CA)

( * ) Notice: Subject to any disclaimer, the term of this patent is extended or adjusted under 35 U.S.C. 154(b) by 0 days.

(21) Appl. No.: 15/598,483

(22) Filed: May 18, 2017

(65) Prior Publication Data

US 2017/0334756 A1 Nov. 23, 2017

(30) Foreign Application Priority Data

May 20, 2016 (CA) ...................................... 2930621

(51) Int. Cl.
| | |
|---|---|
| *C02F 3/10* | (2006.01) |
| *C02F 3/34* | (2006.01) |
| *C02F 3/20* | (2006.01) |
| *C02F 3/06* | (2006.01) |

(Continued)

(52) U.S. Cl.
CPC ................... *C02F 3/10* (2013.01); *C02F 3/06* (2013.01); *C02F 3/101* (2013.01); *C02F 3/20* (2013.01); *C02F 3/34* (2013.01); *C02F 2101/30* (2013.01); *C02F 2103/007* (2013.01); *Y02W 10/15* (2015.05)

(58) Field of Classification Search
CPC .... C02F 3/06; C02F 3/10; C02F 3/101; C02F 3/20; C02F 3/34; C02F 3/28; C02F 3/2806; C02F 3/284; C02F 3/2813; C02F 3/02; C02F 3/025; C02F 2103/007; C02F 2101/30; Y02W 10/15; Y02W 10/10
USPC .......... 210/150, 601, 620, 615, 616, 170.09, 210/170.1
See application file for complete search history.

(56) References Cited

U.S. PATENT DOCUMENTS

| | | | | |
|---|---|---|---|---|
| 4,137,171 A | * | 1/1979 | Yokata ...................... | C02F 3/06 210/150 |
| 4,668,443 A | * | 5/1987 | Rye ......................... | B01D 47/00 165/166 |

(Continued)

*Primary Examiner* — Nam X Nguyen
*Assistant Examiner* — Julia L. Wun
(74) *Attorney, Agent, or Firm* — William J. Clemens; Shumaker, Loop & Kendrick, LLP

(57) ABSTRACT

A device for the housing and stimulation of underwater microbial activity has a lower inlet end and an upper discharge end, the lower inlet end defining an inlet opening therein, the housing defining multiple channels therein extending to the upper discharge end of the housing, the inlet opening communicating with interconnected channels, following an indirect non linear path between the inlet end opening to a discharge opening defined in the discharge end, so as to disrupt the path of fluid as it travels from the inlet opening to the discharge opening. The device has at least one leg extending from the lower inlet end to keep the device off the bottom of a waterbody floor to limit its susceptibility to clogging from the sediment bottom or growing organics. The leg has sufficient weight to sink to the bottom.

19 Claims, 1 Drawing Sheet

(51) Int. Cl.
*C02F 101/30* (2006.01)
*C02F 103/00* (2006.01)

(56) References Cited

U.S. PATENT DOCUMENTS

| | | | | |
|---|---|---|---|---|
| 7,491,325 B2 * | 2/2009 | Kulick, III | ............... | C02F 3/101 210/150 |
| 2003/0046912 A1 * | 3/2003 | Vellinga | ............. | B01D 21/0042 55/444 |
| 2004/0074839 A1 * | 4/2004 | Paloheimo | .............. | C02F 3/101 210/615 |
| 2011/0259804 A1 * | 10/2011 | Reitzel | .................... | C02F 3/101 210/198.1 |
| 2012/0152832 A1 * | 6/2012 | Johnson | .................... | C02F 3/02 210/615 |

* cited by examiner

DEVICE FOR HOUSING BENEFICIAL MICROBES FOR THE PURPOSE OF WATER REMEDIATION

FIELD OF THE INVENTION

This invention relates to a device that is designed to both house and stimulate the proliferation and growth of beneficial bacteria that are commonly found in sub surface water systems either naturally or introduced for the purpose of consuming organic pollutants that are in the waterbody.

BACKGROUND OF THE INVENTION

It is commonly desired in the corporate and municipal setting to utilize water treatment solutions other than chemical treatment of water, preferring utilization of naturalized waterbodies. Chemically treated water that was common for decorative aesthetic purposes in previous decades is being less desirable due to environmental impact. The problem of managing water quality is not new, being references in poetry dating back to the mid 1600s where waterwheels were used for the specific purpose of removing volatile organic compounds from public waters. In the mid 1800s the first municipal water treatment in the form of cascading waterfalls were used to remove odor and although it was not known at the time, this allowed the sun's ultraviolet rays to disinfect the water as well. The improvements in water management have been mostly in the application of chemical processes that have been determined to have serious side effects and are best left to industrial processing of water for drinking purposes. There is a need for a device that promotes the fostering of beneficial microbes for the purpose of water remediation. In recent years there has been the introduction of microbes for the purpose of consuming organic pollutants, but the living requirements of these microbes has not been addressed.

SUMMARY OF THE INVENTION

The herein invention utilizes naturally occurring beneficial bacteria to consume organic sediment commonly found in polluted waterbodies to create a balance that will produce a sustainable waterbody. In a way analogous to humans, the microbial population can be insulated and reinforced by the addition of a structure to ensure shelter and a steady supply of oxygen and food.

In accordance with an aspect of the invention there is provided a device for the housing and stimulation of underwater microbial activity comprising a housing having a lower inlet end and an upper discharge end, the lower inlet end defining an inlet opening therein, said housing defining multiple channels therein extending to the upper discharge end of said housing, said inlet opening communicating with said multiple channels, said channels following an indirect non linear vertical path between said inlet end opening to a discharge opening defined in said discharge end, so as to disrupt the path of fluid as it travels from inlet opening to said discharge opening. In accordance with a further aspect of the invention, the device may include a gas diffuser, which itself may be integrated into a lower portion of the housing, imparting gas into the fluid/water as it rises. The inlet opening area may be smaller than the size of the discharge opening area and in accordance with a particular aspect of the invention, the upper end discharge opening is at least 4 times the size of the inlet opening area.

In accordance with a further aspect of the invention, the channels are defined by walls having a textured course surface to provide the optimum environment for colonization of aerobic bacteria.

In accordance with a further aspect of the invention, the housing has at least one leg extending from the lower inlet end to keep the device off the bottom of the waterbody to limit its susceptibility to clogging from the sediment bottom or growing organics. In accordance with yet a further aspect of the invention, the at least one leg may have sufficient weight to allow the invention to sink to the bottom of the water body and rest on bottom.

DETAILED DESCRIPTION OF EXAMPLE EMBODIMENTS

Amongst its applications this invention has the means to provide shelter for microbes while providing them with an aerobic environment to ensure the area around the invention is not septic. This technology is particularly suited to the lake management field where bodies of water over time become stagnant and the collection of organics from natural sources, such as, but not limited to, grass clippings, fertilizer, agricultural waste, aquaculture skim, coffee cups newspapers and street runoff collect and sink to the bottom either naturally, or by the use or flocculants and binders. This sediment becomes increasingly toxic over time and is the driving factor behind anoxic conditions that eventually result in septic conditions that have the negative side effect of pathogenic production, primarily *E. coli* and *salmonella* in the agricultural fields. This invention both houses and stimulates aerobic activity that can naturally remediate the organic sediment and pollutants and reverse the common complaints from decorative waterbodies, primarily, odor, algae, poor clarity and most other conditions that deter from the waterbodies ability to create a natural ecosystem supporting beneficial organisms, fish and other items which would be considered natural. Example applications for this invention include lake and pond management for the golf industry, commercial and industrial water remediation of holding ponds and generally water that has high, non petroleum organic contamination that can be broken down microbially through the nitrogen cycle.

Figure 1:
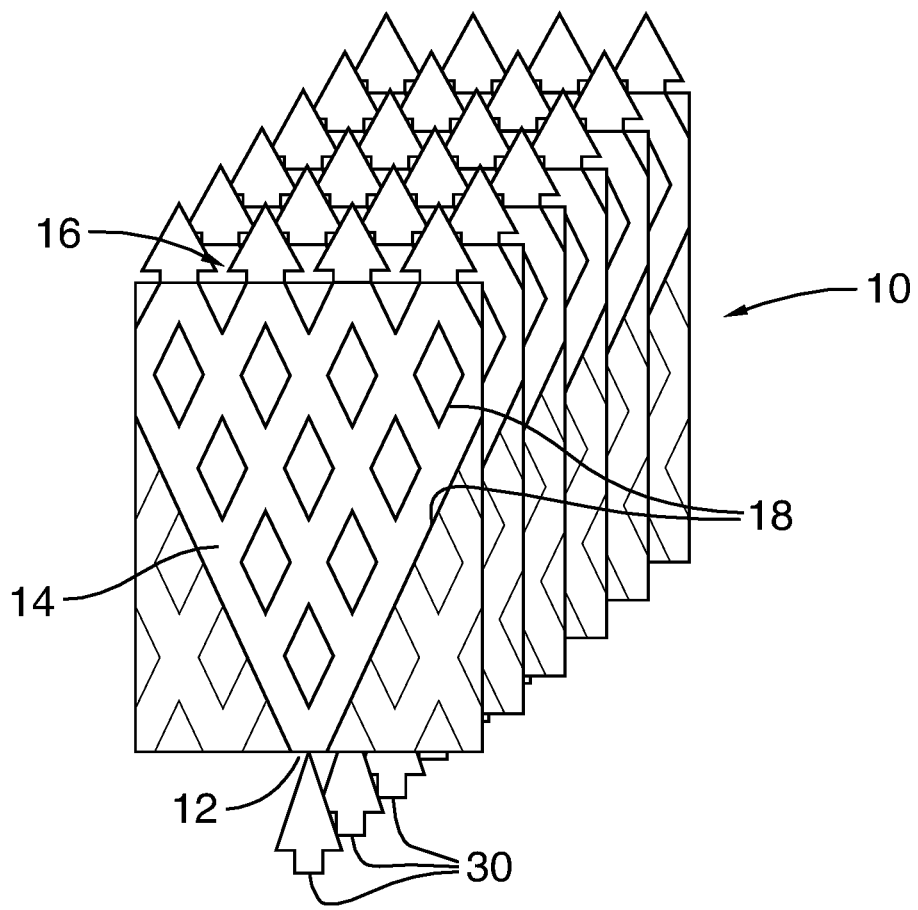
FIG. 1 is an exploded perspective view of a liquid/gas source entering an example embodiment of the invention, where at discharge, the area is shown to have been increased by 400% over inlet area.

As shown in FIG. 1, the device 10 in an expanded sectional view so as to illustrate the channels 14, fluid (represented by arrow 30) infused with gas enters the device housing 10a through the inlet opening 12 and rises through the channels 14 and becomes spread to the point where at discharge its area 16 has been increased by 400% for example. The illustration of the channels of the device shown in FIG. 1 is by example only, noting that the fluid may pass through channels having any conceivable non linear indirect and/or interconnected path, not expressly illustrated.

Figure 2:
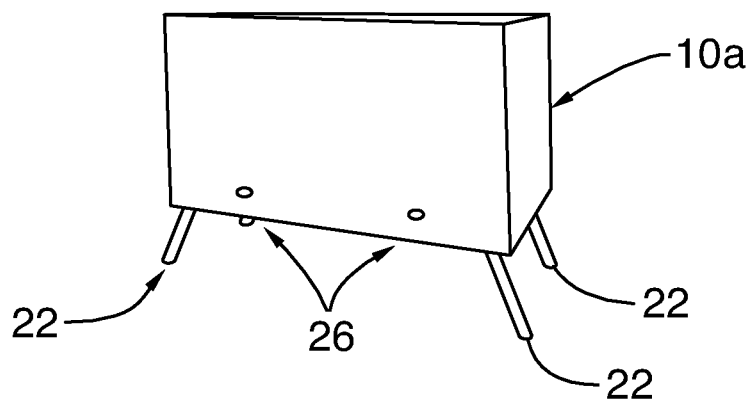
FIG. 2 is an illustration of an example embodiment of the invention showing the example housing, legs and the integrated gas diffusers.

As shown in FIG. 2, an example embodiment of the invention has the housing 10 including legs 22 or a mounting system to keep the inlet opening of the device off the bottom of the waterbody and thereby limit its susceptibility to clogging from the sediment bottom or growing organics. In accordance with an aspect of the invention, the legs have sufficient weight to allow the invention to sink to the bottom of the water body.

In accordance with an aspect of the invention there is provided a structure composed for example of a thermoformed or injection moulded plastic media with a network of channels passageways which are interconnected, that can provide a randomized fluid path for flowing water that is rich in organic pollutants and in need of remediation.

The channels are angled, such that the water flow is spread over a wider area and the duration the water is within the housing is substantially longer than if it was forced through a linear vertical passageway. As shown in FIG. 1, the multiple channels 14 connected between the inlet opening 12 and the discharge outlet openings 16 are formed in a latticework pattern in a vertically extending plane. Six separate sets of the multiple channels forming the device 10 are shown, but more or less sets can be used. In each set, the channels 14 in a first group extend in parallel in the vertical plane angled to the left and the channels 14 in a second group extend in parallel in the vertical plane angled to the right. Each channel 14 of the first group is interconnected with each channel 14 of the second group that intersects it to form the latticework pattern of channels. Thus, each set of the channels 14 defines an indirect non linear vertical only upward fluid flow path as there is no horizontal fluid flow.

The invention is designed to work completely submerged at all times and has greater effectiveness when placed in deeper waterbodies.

In accordance with further aspect of the invention, the structure composed of said plastic can have the channels 14 defined by textured channel walls 18, textured as to provide improved area for the microbes to attach to. The preferred texturing is formed in the channel walls such as with ridges or grooves or any similar easy to form economically features, but may also take the form of string, foam or the like adhered to the walls or in some embodiments, the walls may be plain flat.

A diffuser aeration system may be included to allow for increased oxygen content to wastewater in the structure, allowing microorganisms to biologically decompose soluble organic contaminants in wastewater.

In accordance with further aspect of the invention a gas diffusion device 26 can be integrated to the structure, allowing improved motive force for the fluid (i.e. water) if there are no natural currents available. In an example embodiment, the gas diffusion device 26 is placed inside of the structure, however it can also be placed under the structure such that the rising column of gas from the diffuser naturally enters the structure and causes water to circulate through the invention. An example embodiment of the invention is supplemented with atmospheric air as the diffused gas, however it has been shown to work with oxygen, ozone and other gases. In fluids that have extreme nitrogen compound concentrations the invention can be utilized as an anaerobic bacterial chamber and be fed with nitrogen or other oxygen free gas to provide motive force. Generally, this is not recommended.

The invention having air introduced and spread via angled non linear passageways provides a larger area of rising column of bubbles when the total flow of water and gas exits the invention.

The invention having introduced air into its passageways in conjunction with textured structure provides a desirable environment for colonization of aerobic bacteria.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

The invention claimed is:

1. A device for the housing and stimulation of underwater microbial activity comprising a housing having a lower inlet end and an upper discharge end and bacteria, said housing defining multiple channels therein extending from a single inlet opening at the lower inlet end upwardly to a plurality of discharge openings at the upper discharge end of said housing in a latticework pattern in a single vertically extending plane, said inlet opening communicating directly with said multiple channels, said channels following an indirect non linear vertical upward path between said inlet opening and the discharge openings defined in said discharge end, so as to disrupt the path of fluid as it travels from said inlet opening to the discharge openings, wherein said multiple channels are defined by walls, said bacteria are attached to said channel walls, and an area of said inlet opening is smaller than a total area of the discharge openings and said multiple channels provide separate flow paths from the inlet opening to said plurality of discharge openings.

2. A device as recited in claim 1 wherein a gas diffuser is integrated into a lower portion of the housing, imparting gas into the water as it rises.

3. A device as recited in claim 1 wherein the total area of the plurality of discharge openings is at least 4 times the area of the inlet opening.

4. A device as recited in claim 2 wherein the diffused gas is atmospheric air, oxygen, nitrogen or ozone.

5. A device as recited in claim 1 wherein the channel walls have a textured surface to provide a desirable environment for colonization of aerobic bacteria.

6. A device as recited in claim 5 wherein the texturing is formed by string, foam, or integrally formed into the channel walls.

7. A device as recited in claim 2, wherein the housing has at least one leg extending from the lower inlet end to keep the device off a bottom of a waterbody to limit a susceptibility of the device to clogging from a sediment bottom or growing organics.

8. A device as recited in claim 7 wherein the at least one leg has sufficient weight to allow the device to sink to the bottom of the waterbody and rest on the bottom.

9. A device as recited claim 1 comprising a thermoformed or injection moulded plastic.

10. A device as recited in claim 1 wherein said multiple channels are interconnected with each other.

11. A device as recited in claim 1 wherein the total area of said plurality of discharge openings is 400% larger than the area of said inlet opening.

12. A device as recited in claim 1 wherein the plurality of discharge openings are formed as at least two openings each communicating with an end of different ones of said multiple channels.

13. A device as recited in claim 1 wherein the plurality of discharge openings are formed as four openings each communicating with an end of different ones of said multiple channels.

14. A device for the housing and stimulation of underwater microbial activity comprising a housing having a lower inlet end and an upper discharge end and bacteria, the lower inlet end defining a single inlet opening therein, said housing defining multiple channels therein in a latticework pattern, said channels extending from the inlet opening at the lower inlet end upwardly to the upper discharge end of said housing in a single vertical plane, said inlet opening communicating directly with said channels, said channels following an indirect non linear vertical upward path between said inlet opening and a discharge opening defined in said discharge end, so as to disrupt the path of fluid as it travels from said inlet opening to said discharge opening, wherein said channels in the latticework pattern are interconnected, said channels are defined by walls, and said bacteria are attached to said channel walls.

15. A device as recited in claim 14 wherein the latticework pattern includes a first group of the channels extending in parallel in a vertical direction angled to the left and a second group of the channels extending in parallel in the vertical direction angled to the right.

16. A device as recited in claim 14 wherein the upper end discharge opening is at least 4 times the area of the inlet opening.

17. A device as recited in claim 14 wherein the multiple channels formed in the latticework pattern are a first set of multiple channels and the vertically extending plane is a first plane, including a second set of multiple channels formed in a latticework pattern in a second vertically extending plane, and wherein the second plane is parallel to the first plane.

18. A device for the housing and stimulation of underwater microbial activity in a waterbody comprising:

a housing adapted to be submerged in a waterbody and supported above a bottom of the waterbody;

the housing having a lower inlet end at a bottom of the housing and an upper discharge end at a top of the housing;

the housing defining a plurality of sets of multiple channels therein, each of the sets of multiple channels extending from the lower inlet end upwardly to the upper discharge end of the housing in a latticework pattern in an associated single vertically extending plane;

each of the sets of multiple channels having a single inlet opening communicating directly with the lower inlet end and a plurality of discharge openings communicating directly with the upper discharge end, the channels following an indirect non linear vertical upward path between the inlet opening and the plurality of discharge openings so as to disrupt a path of fluid as it travels from the inlet opening to the plurality of discharge openings, the multiple channels providing separate flow paths for the fluid from the inlet opening to the plurality of discharge openings; and bacteria;

wherein said multiple channels are defined by walls, said bacteria are attached to said channel walls, and an area of the inlet opening is smaller than a combined area of the plurality of discharge openings.

19. The device according to claim 18 wherein each of the sets of multiple channels has four discharge openings.

\* \* \* \* \*